United States Patent [19]

Ishii et al.

[11] Patent Number: 5,053,875
[45] Date of Patent: Oct. 1, 1991

[54] FLUCTUATION STABILIZATION IMAGE PICKUP DEVICE

[75] Inventors: Hirofumi Ishii, Moriguchi; Atsushi Morimura, Nara, both of Japan

[73] Assignee: Matsushita Electric Industrial Co., Ltd., Osaka, Japan

[21] Appl. No.: 494,459

[22] Filed: Mar. 16, 1990

[30] Foreign Application Priority Data

Mar. 22, 1989 [JP] Japan .................................. 1-069655

[51] Int. Cl.$^5$ ........................................... H04N 5/228
[52] U.S. Cl. .................................... 358/222; 358/209;
358/228; 358/213.19
[58] Field of Search .................... 358/213.19, 222, 228,
358/209, 213.2 X, 125, 105, 166, 167, 183

[56] References Cited

U.S. PATENT DOCUMENTS

| | | | |
|---|---|---|---|
| 4,597,014 | 6/1989 | Suzuki | 358/213.19 |
| 4,691,230 | 9/1987 | Kaneko et al. | 358/105 |
| 4,796,090 | 1/1989 | Fraie | 358/222 |
| 4,837,632 | 6/1989 | Kubo et al. | 358/222 |
| 4,856,882 | 8/1989 | Oshima et al. | 350/500 |
| 4,862,277 | 8/1989 | Iwaibana | 358/222 |
| 4,959,725 | 9/1990 | Mandle | 358/222 |

FOREIGN PATENT DOCUMENTS 61-198879 3/1986 Japan .

OTHER PUBLICATIONS

*A New Technique To Improve Video Stability by Digital Processing,* Nov. 1988, pp. 908–910, by Matsuzuru et al.

Primary Examiner—John K. Peng
Assistant Examiner—Tuan V. Ho
Attorney, Agent, or Firm—Stevens, Davis, Miller & Mosher

[57] ABSTRACT

An image pickup device is provided which includes an image pickup unit, a fluctuation stabilizer, an exposure time controller, and a computing unit. The image pickup unit sends a video signal to the fluctuation stabilizer in which unnecessary fluctuations of the image output by the image pickup unit are stabilized depending on a stabilization reference value. The exposure time controller serves to control an exposure time used for the image pickup unit depending on the exposure time reference value. The computing unit functions to compute the stabilization reference value and the exposure time reference value. Such image pickup device produces an improved visually natural image.

5 Claims, 16 Drawing Sheets

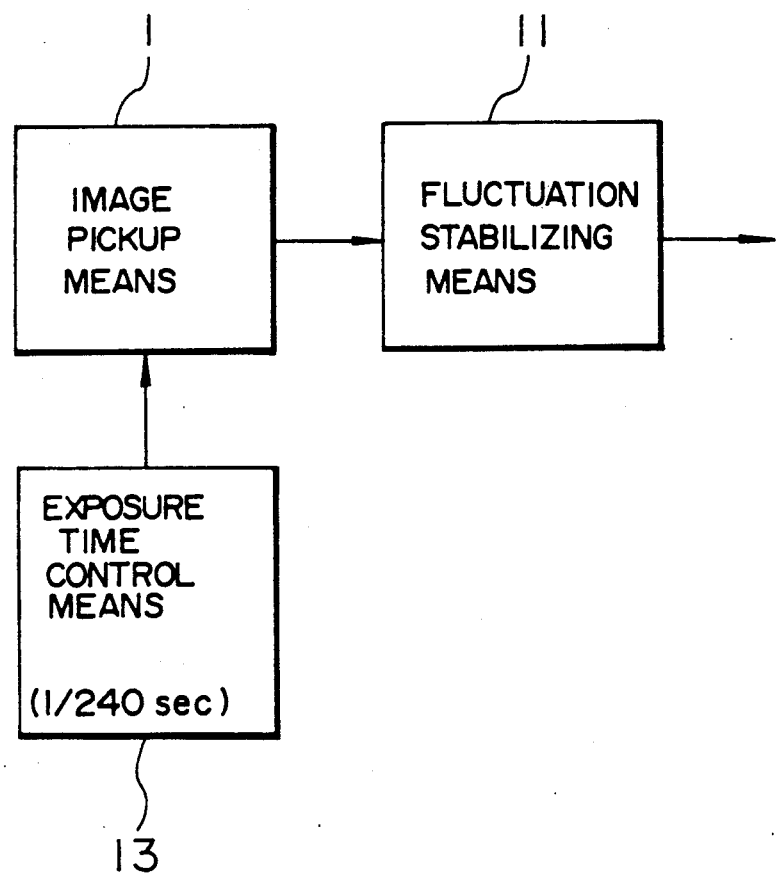

FLUCTUATION STABILIZATION IMAGE PICKUP DEVICE

BACKGROUND OF THE INVENTION

The present invention relates to an image pickup device, and more particularly to an image pickup device which is capable of producing an excellent image if an image is picked up in a fluctuating state.

In recent days, as the users of an image pickup device become more and more, unskilled persons may more often handle the image pickup device, in addition, the image pickup device is likely to raise its zooming magnification.

It is likely that the unskilled persons, however, cannot firmly keep the image pickup device with their hands when they use it for picking up an image. And, even skilled persons may not firmly keep the image pickup device if they use the device with a high zooming magnification. The resulting images may be so vibrated that they become obscure. Moreover, when a user picks up an image on a moving place such as a car, the resulting images also may be often so vibrated that they become obscure.

There has been required an image pickup device which is capable of producing an excellent image when the device is handled in a fluctuating state.

Under those circumstances, there have been heretofore developed techniques for stabilizing a fluctuated image. One of such stabilizing techniques will be discussed below.

One of the conventional stabilizing techniques has been proposed in the JP-A61-198879. FIG. 1 is a block diagram showing an image pickup device employing the technique for correcting the fluctuated image. FIG. 2 is a schematic illustration for describing the operation of the image pickup device to which the technique is applied.

As shown in FIG. 1, 1 is an image pickup means, 2 is a motion vector detector, 3 is a field memory, and 4 is a readout position control means. As shown in FIG. 2, 5 is an image represented by a video signal sent from the image pickup means 1, 6 and 6' are screens displaying images of the current field and the previous one read out from the field memory 3, 7 and 7' are images of the current and previous fields displayed on the screens, and 8 is a motion vector. The following description is directed to the operation of the image pickup device employing the fluctuated image stabilizing technique as designed above.

At first, the image pickup means 1 outputs a video signal. The screen 5 represented by the video signal is shown in FIG. 2. The field memory 3 stores a one-field portion of the video signal. The motion vector detector 2 serves to detect parallel movement (referred to as a motion vector) of an image in the current field against the image in the previous field on screen out of the video signal. The motion vector is indicated by 8 in FIG. 2. The readout position control means serves to shift the position at which the video signal is read out of the field memory 3 of stabilizing the motion, based on the motion vector detector from the motion vector detector 2, such that the position is shifted from numerals 7 to 7' shown in FIG. 2.

If, therefore, the image pickup device handled in a fluctuating state results in producing fluctuated images indicated by 7 and 7' in FIG. 2, the movement of the images 7 to 7' can be relatively stabilized against the screens 6 and 6' represented by a video signal read out by the field memory 3. The stabilization provides an image formed as if the image pickup device were not fluctuated.

The foregoing image pickup device, however, can stabilize the fluctuation field-by-field but cannot stabilize a blurred image resulting from in-field fluctuation of the device. Hence, though the position of an image on screen is not moved, the blurring generated on edge portions of the image is varied, resulting in often generating a visually unnatural image.

FIG. 3 shows graphs for describing the foregoing disadvantage. FIG. 3a is a graph indicating how a point placed on an optical image is moved if an image is picked up in a fluctuating state. FIG. 3b is a graph indicating how a point on the image at each field matching to the point movement shown in FIG. 3a is changed. FIG. 3'c is a graph indicating fluctuation-stabilized images. As shown in FIG. 3a, if the image pickup device handled in a fluctuating state results in moving a point on the image, the point on the image at each field is moved between two fields 24 and it is blurred within each field itself in proportion to the speed of a point movement 22. (Hereinafter, the between-field movement 24 of the image is referred to as fluctuation and the in-field image blurring 22 is referred to as a blurring.)

If the image is fluctuation-stabilized, as shown in FIG. 3c, the point on the image stays on its position but is subject to the blurring 22 in proportion to the fluctuating speed of the image pickup device.

As shown in FIG. 3b, if the blurring 22 caused on an image at each field has the visually same direction as the between-field movement 24 of an image, the image is recognized as a natural motion picture. As shown in FIG. 3c, if the blurring 22 is caused to change in proportion to the speed at which the image pickup device is fluctuated, the image is recognized as a quite unnatural image even if the between-field movement of the image is stabilized and the image remains motionless.

As has been mentioned above, the image pickup device employing the conventional fluctuation-stabilizing technique causes a blurring mismatched to the between-field movement even on the stabilized image, resulting in producing a quite unnatural and unappreciable image from a visual point of view.

SUMMARY OF THE INVENTION

To solve the aforementioned shortcomings, it is, therefore, an object of the present invention to provide an image pickup device which is capable of producing a natural and appreciable image even if an image is picked up in a fluctuating state by an unskilled person or from a movable point such as a car.

To achieve the above object, according to one aspect of the invention, an image pickup device includes an image pickup means, a stabilizing means for stabilizing unnecessary fluctuation of an image output from the image pickup means, and a control means for controlling an exposure time of the image pickup means.

According to another aspect of the invention, an image pickup device includes an image pickup means, a stabilizing means for stabilizing unnecessary fluctuation on an image output by the image pickup means according to a stabiliztion reference value, and a control means for controlling an exposure time of the image pickup means according to a reference value for an exposure time, and a computing means for computing the stabilizing reference value and the reference value for an exposure time.

BRIEF DESCRIPTION OF THE DRAWINGS

FIG. 4 is a block diagram showing an image pickup device according to a first embodiment of the invention;

DESCRIPTION OF THE PREFERRED EMBODIMENTS

A description will be directed to one embodiment of the invention with reference to the drawings.

FIGS. 4 is a block diagram showing an image pickup device according to a first embodiment of the invention. As shown, 1 is an image pickup means, 11 is a fluctuation stabilizing means, and 13 is an exposure time control means.

The operation of an image pickup device according to the first embodiment designed above will be described as follows.

At first, the exposure time control means 13 serves to control an exposure time of the image pickup means 1 (a storage time given when a one-field portion of a video signal is picked out of an optical image) to be 1.240 sec.

Then, the image pickup means sends a video signal to the fluctuation stabilizing means 11. The fluctuation stabilizing means 11 serves to detect a motion vector for an overall screen from the video signal, correct an unnecessary fluctuation component of an image, and output the resulting signal.

Figure 1:
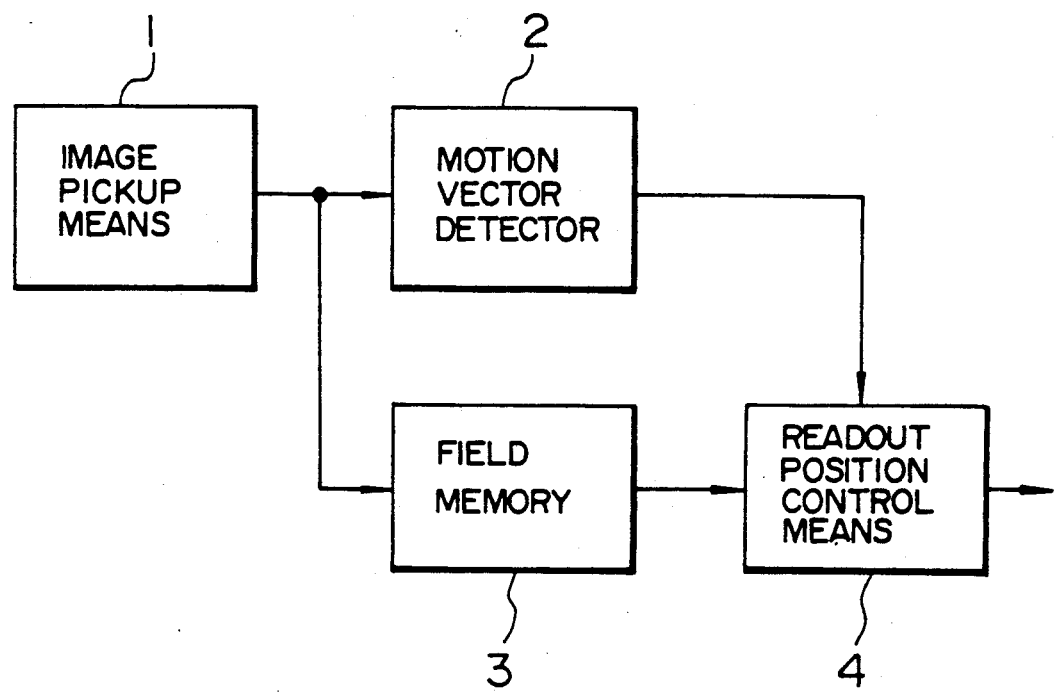
FIG. 1 is a block diagram showing an image pickup device to which a conventional fluctuation-stabilizing technique is applied.
Figure 2:
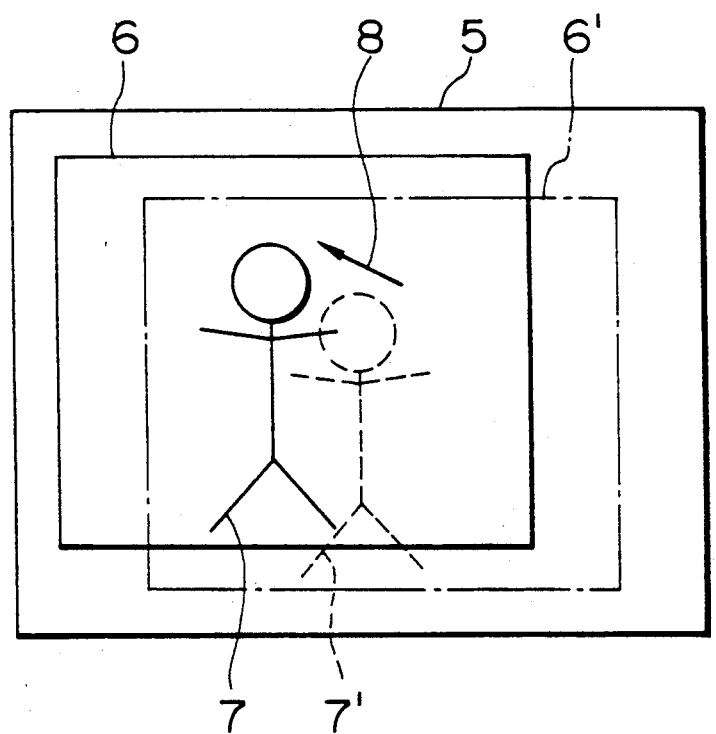
FIG. 2 is a schematic illustration for describing the operation of an image pickup device according to the prior art.
Figure 3A:
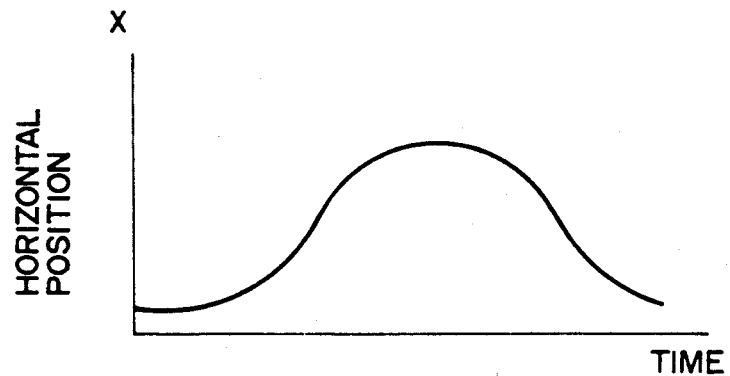
FIGS. 3a, b, c are graphs for describing the above.
Figure 3B:
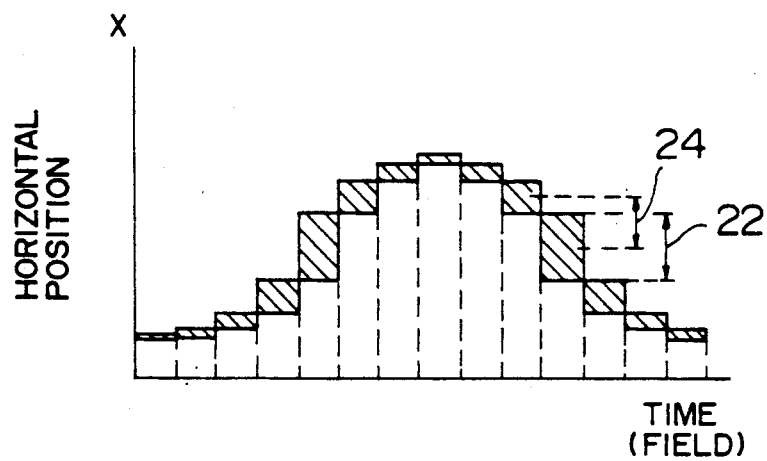
Figure 3C:
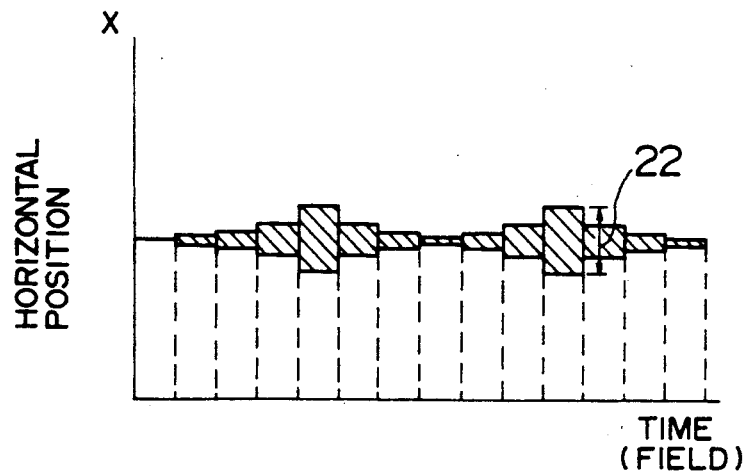
Figure 5A:
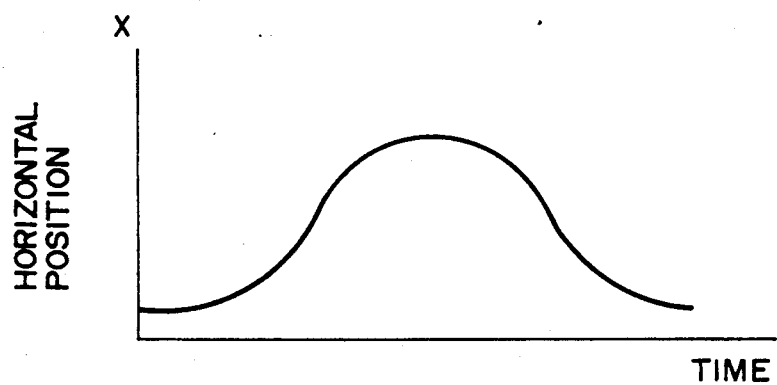
FIGS. 5a, b, and c are graphs for describing the operation of an image pickup device according to the first embodiment.
Figure 5B:
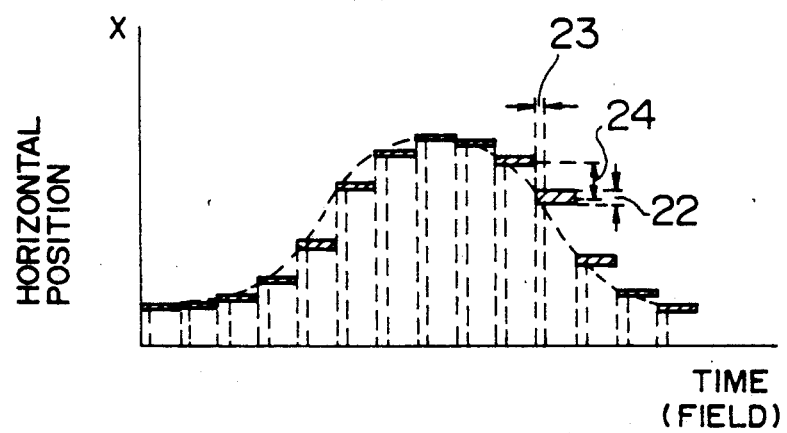
Figure 5C:
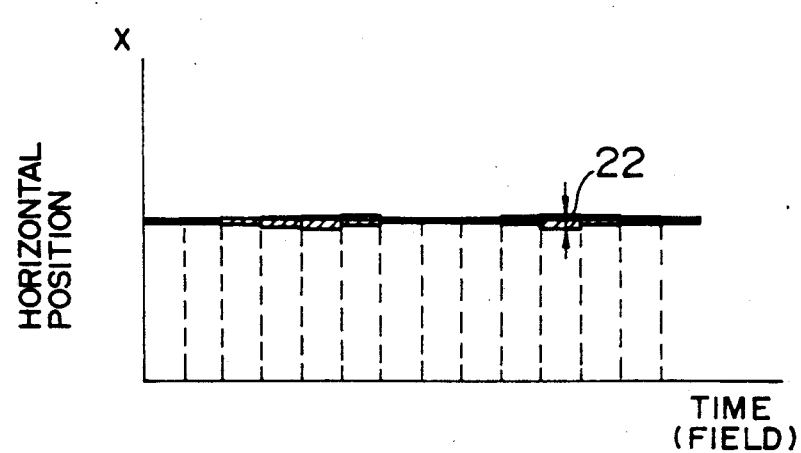

FIGS. 5a, b, and c are graphs for describing the operation of this embodiment. FIG. 5a indicates the movement of a point on an optical image given when a camera is not firmly kept in picking up an image. FIG. 5b indicates the resulting image at each field. FIGS. 5c is a fluctuation-stabilized image. As shown in FIG. 5a, if the fluctuation of the image pickup device results in causing movement of a point on the image, the point on the image at each field provided by the image pickup means, as shown in FIG. 5b, is shifted as shown by 24. At the same time, a blurring 22 is caused within an image at each field, where the magnitude of the blurring 22 is proportional to a product of the fluctuating speed of the image pickup device and the exposure time 23. By controlling the exposure time to be 1/240 sec, therefore, it is possible to suppress the blurring to be a quarter as much as that given in case of 1/60 sec, thereby suppressing the blurring 22 of the image for one field to be $\frac{1}{4}$. The point on the fluctuation-stabilized image results in being visually appreciable one, as shown in FIG. 5c.

As has described above, according to the present embodiment, the fluctuation stabilizing means stabilize the fluctuation of an image at each field. The exposure time control means then controls the exposure time for suppressing a blurring of an image at each field to a small value, resulting in also suppressing visually unnatural factors of an image, thus, forming an excellent fluctuation-stabilized output singnal.

Figure 6:
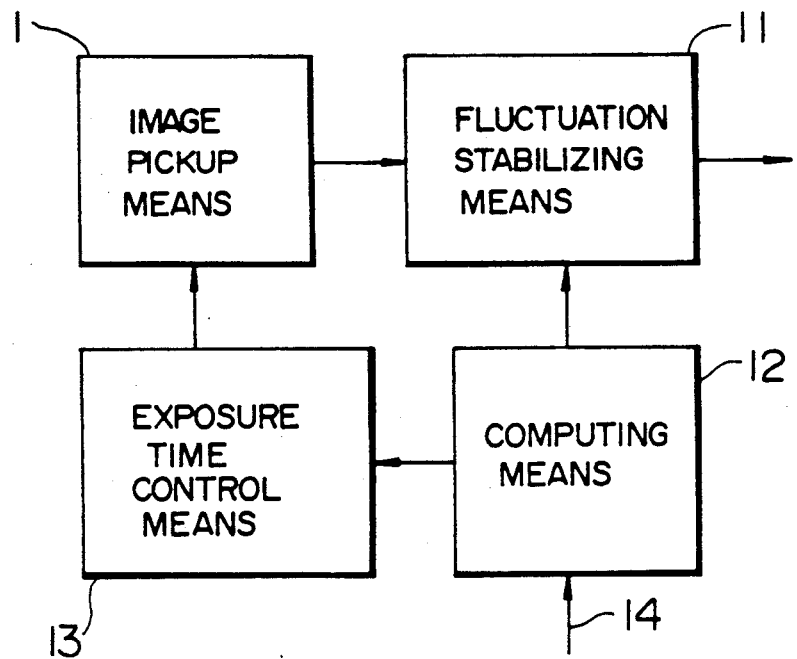
FIG. 6 is a block diagram showing an image pickup device according to a second embodiment of the invention.

FIG. 6 is a block diagram showing an image pickup device according to an second embodiment of the invention. As shown, 1 is an image pickup means, 11 is a fluctuation stabilizing means, 12 is a computing means, 13 is an exposure time control means, and 14 is a fluctuation stabilizing switch signal.

The operation of the second embodiment designed above will be described below.

The operation of computing means 12 is described with reference to FIGS. 16–19.

At first, a user selects an on or off mode of a fluctuation stabilization switch signal. Then, the signal is input to the computing means 12 (step 301). The computing means 12 serves to switch on a stabilization reference value (step 305) if the stabilization switch signal is switched on (step 302) and control the exposure time reference value to change the exposure time to 1/240 sec (step 304). It serves to switch off the stabilization reference value if the stabilization switch signal is off and control the exposure time reference value to change the exposure time to 1/60 sec (step 304). Each stabilization reference value is outputted (steps 305, 306) to the fluctuation stabilizing means 11 and the exposure time reference value is output to the exposure time control means 13.

The exposure time control means 13 serves to control an exposure time of the image pickup means according to the exposure time reference value obtained by the computing means 12. The image pickup means 1 outputs a video signal to the fluctuation stabilization means 11.

And, the exposure time control means 13 serves to control an exposure time of the image pickup means 1 according to the exposure time reference value provided by the computing means 12. Then, the image pickup means 1 outputs a video signal to the fluctuation stabilizing means 11.

The fluctuation stabilizing means 11 serves to detect a motion vector of an overall screen out of the video signal. If the stabilization reference value provided by the computing means 12 is switched on, the means 11 serves to stabilize the fluctuating components of the image. If it is switched off, it serves to output the video signal without stabilizing the fluctuation components of the image.

If the stabilizing switch signal 14 is switched on, therefore, the present embodiment functions in a similar manner to the first embodiment of the invention. It means that the blurring of an in-field image is suppressed to be ¼ by controlling the exposure time of the image pickup means 1. It is, therefore, possible to suppress visually unnatural factors of an image. If the stabilizing switch signal 14 is switched off, the exposure time becomes 1/60 sec which is four times as long as that given if the signal 14 is switched on, resulting in producing an excellent image with a little noise in a gloomy place.

As has been mentioned above, according to the present embodiment, by controlling the exposure time according to an on or off switching of the fluctuation controlling signal, it is possible to produce an excellent image with a little noise in a gloomy place. And, by stabilizing the fluctuation of the image, it is also possible to suppres the in-field blurring of the image to a small amount and suppress visually unnatural factors of the iamge, resulting in producing an excellent fluctuation-stabilized image.

Figure 7:
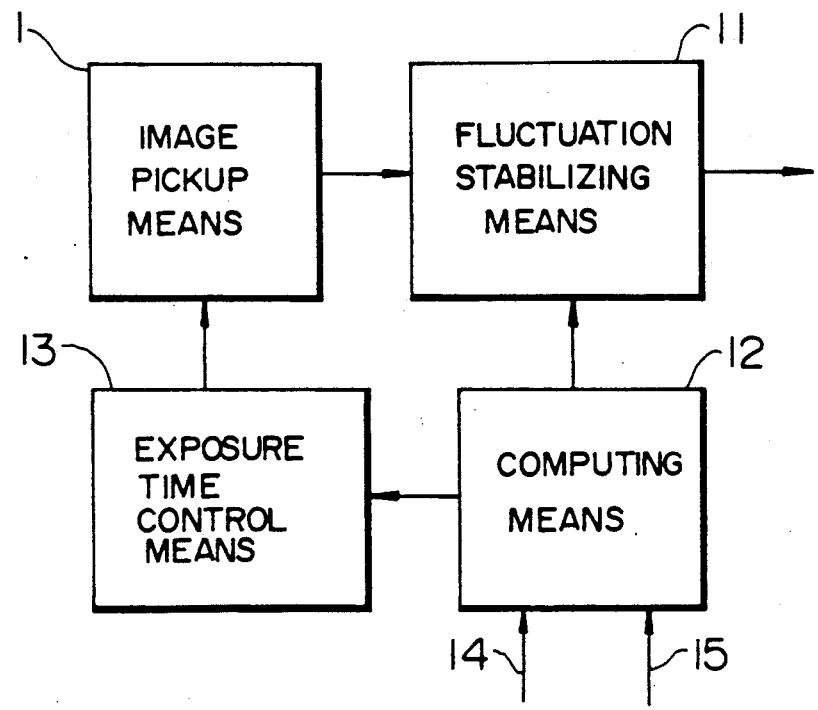
FIG. 7 is a block diagram showing an image pickup device according to a third embodiment of the invention.

Hereinafter, a third embodiment of the invention will be described. FIG. 7 is a block diagram showing an image pickup device according to a third embodiment of the invention. As shown, 1 is an image pickup means, 11 is a fluctuation-stabilizing means, 12 is a computing means, 13 is an exposure time control means, 14 is a fluctuation stabilizing switch signal, and 15 is an exposure time setting signal.

The operation of the image pickup device according to the third embodiment designed above will be described below.

At first, a user selects an on or off mode of the fluctuation stabilizing switch signal. Then, the selected signal is input to the computing means 12 (step 401). And, a value of the exposure time set by the user is input to the computing means 12 as an exposure time setting signal 15 (step 402).

Figure 8:
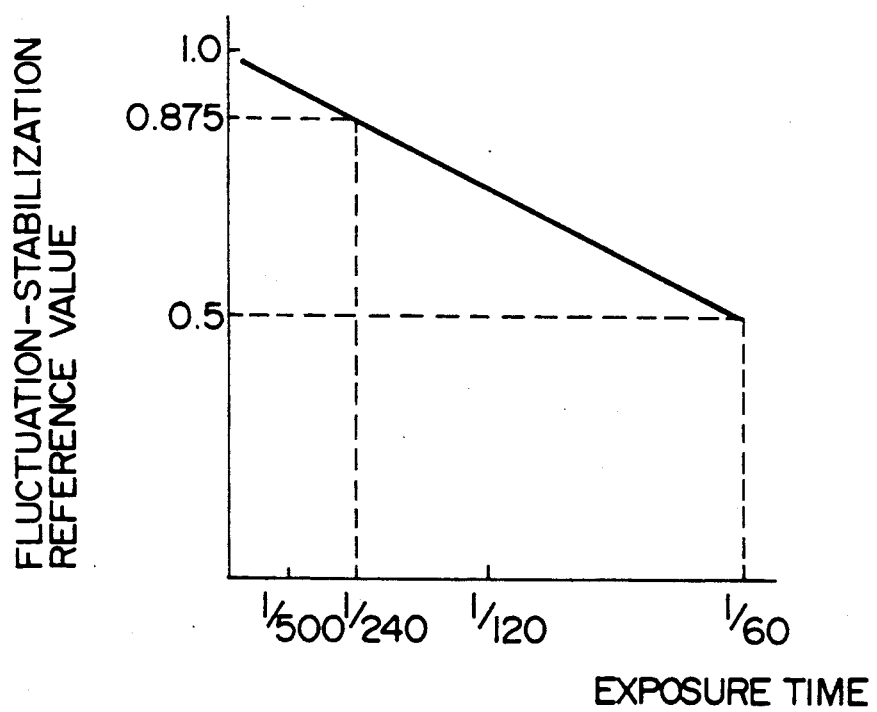
FIG. 8 is a graph showing relation between an exposure time and a fluctuation-stabilizing reference value in a computing means 12 according to the third and the fourth embodiment of the invention.

The computing means 12 serves to output the exposure time setting signal 15 to the exposure time control means 13 as an exposure time reference value (step 403). The computing means 12 serves to compute a stabilization reference value to match to the graph of the relation shown in FIG. 8, based on the input exposure time setting signal 15 (step 405) if the stabilization switching signal 14 is switched on (step 404). Then, the resulting value is output to the stabilizing means 11. If the stabilization switching signal 14 is off (step 404), the stabilization reference value is output as zero to the stabilizing means 11 (step 406).

And, the exposure time control means 13 serves to control an exposure time of the image pickup means 1 according to the exposure time reference value output by the computing means 12. The image pickup means 1 serves to output a video signal to the fluctuation stabilizing means 11.

Figure 9A:
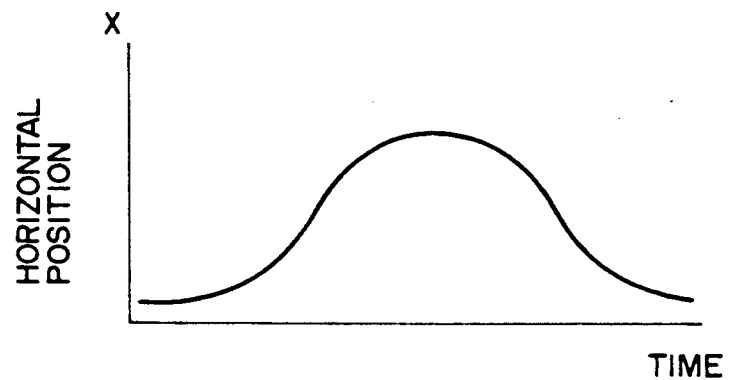
FIGS. 9 a, b, and c and 10 a, b, and c are graphs for describing the operation of the image pickup device according to the third embodiment of the invention.
Figure 9B:
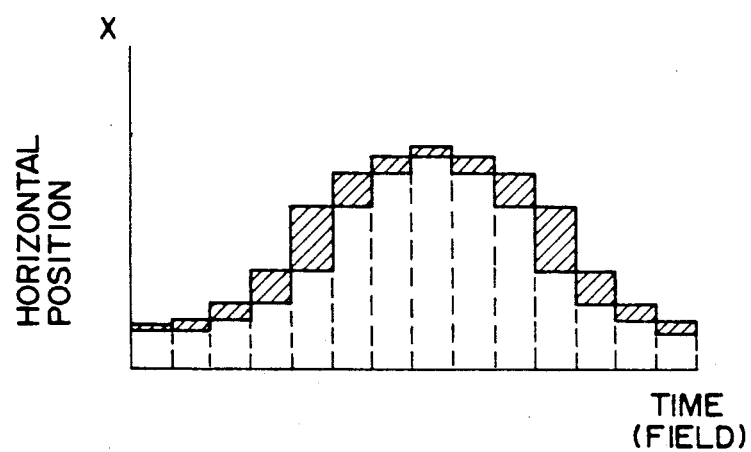
Figure 9C:
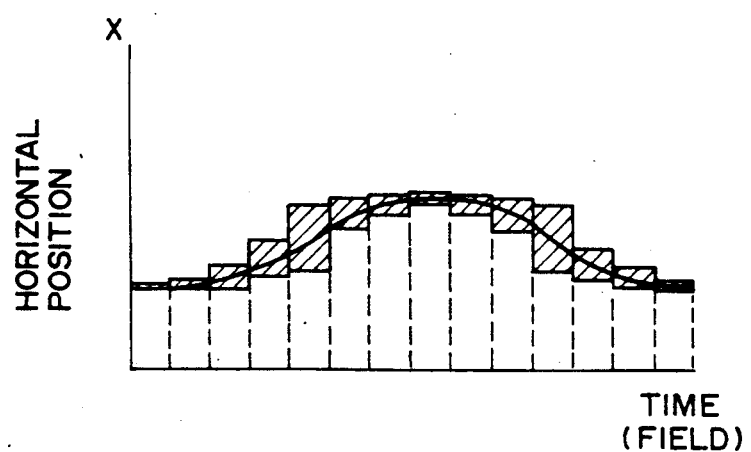

The fluctuation stabilizing means 11 serves to detect a motion vector for an overall screen from the input video signal and stabilize the image by a product of the motion vector and a stabilizing reference value given by the computing means 12, the outputting the resulting signal. p FIGS. 9a, b, and care graphs for describing the operation of the present embodiment assumed that the stabilization switching signal 14 is switched on and the exposure time setting signal 15 suppresses the exposure time to 1/60 sec. FIG. 9a indicates how a point on an optical image is moved if the image is picked up in a fluctuating state. FIG. 9a indicates an image at each field given in the case of FIG. 9a. FIG. 9c indicates a fluctuation-stabilized image. As shown in FIG. 9a, the image pickup device handled in a fluctuating state results in moving the point on the image. In this case, on the image at each field sent from the image pickup means, as shown in FIG. 9b, the point position is moved as well as the blurring of the image at a field is brought about. Since the exposure time reaches 1/60 sec, the computing means 12 serves to compute a stabilizing reference value as 0.5 as shown in FIG. 8a. The in-field fluctuation of the point formed on the fluctuation-stabilized image is stabilized by a product of a motion vector and 0.5 as shown in FIG. 9c. The stabilized image has the remaining fluctuation in the same direction of blurring for one field, said fluctuation matching to a product of the original fluctuation and the stabilization reference value of 0.5. On the stabilized image, the fluctuation at each field is substantially same as the blurring for one field in direction and magnitude. It results in suppressing visually unnatural factors of an image and producing a visually natural image.

Figure 10A:
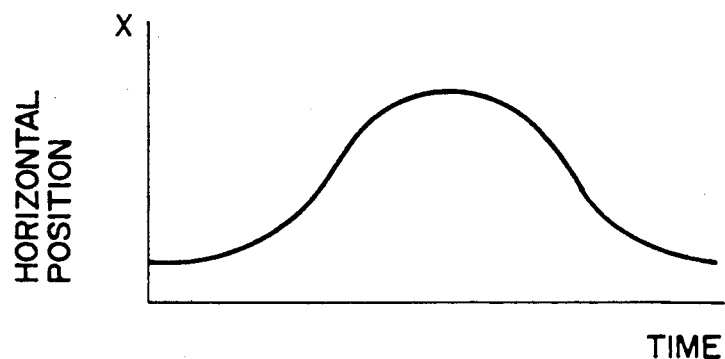
Figure 10B:
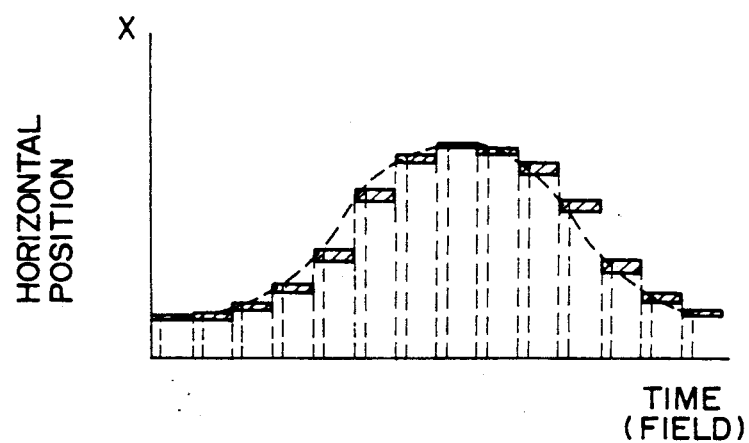
Figure 10C:

FIGS. 10a, b, and c are graphs for describing the operation of the present embodiment assumed that the stabilization switching signal 14 is switched on and the exposure time setting signal 15 serves to suppress an exposure time as 1/240 sec. FIG. 10a indicates how a point on an optical image is moved if an image is picked up in a fluctuating state. FIG. 10b indicates an image at each field given in the case of FIG. 10a. FIG. 10c indicates a fluctuation-stabilized image. As shown in FIG. 10a, the image pickup device handled in a fluctuating state results in moving the point on the image. In this case, on the image at each field sent from the image pickup means, as shown in FIG. 10b, the point position is moved as well as the blurring of the image at a field is brought about in proportion to the exposure time. Since the exposure time reaches 1/240 sec, the computing means 12 serves to compute a stabilization reference value as 0.875 as shown in FIG. 5. The in-field fluctuation is stabilized by a product of a motion vector and 0.875 as shown in FIG. 10c. The image thus stabilized image has 12.5% of the fluctuation occurring before it is stabilized. On the other hand, the blurring within one field where the exposure time is 1/250 second is suppressed to one fourth as compared to the case where the exposure time is 1/60 second. On the stabilized image, the fluctuation at each field is substantially same as the blurring for one field in direction and magnitude. It results in suppressing visually unnatural factors of an image and producing a visually natural image.

As has been mentioned above, according to the present embodiment, the computing means serves to compute how much of fluctuation is stabilized according to the set exposure time. If the expsoure time is variable, therefore, the blurring for one field is matched in direction and magnitude to the fluctuation at each field, resulting in suppressing visually unnatural factors of an image and producing an excellent fluctuation-stablized image.

Figure 13:
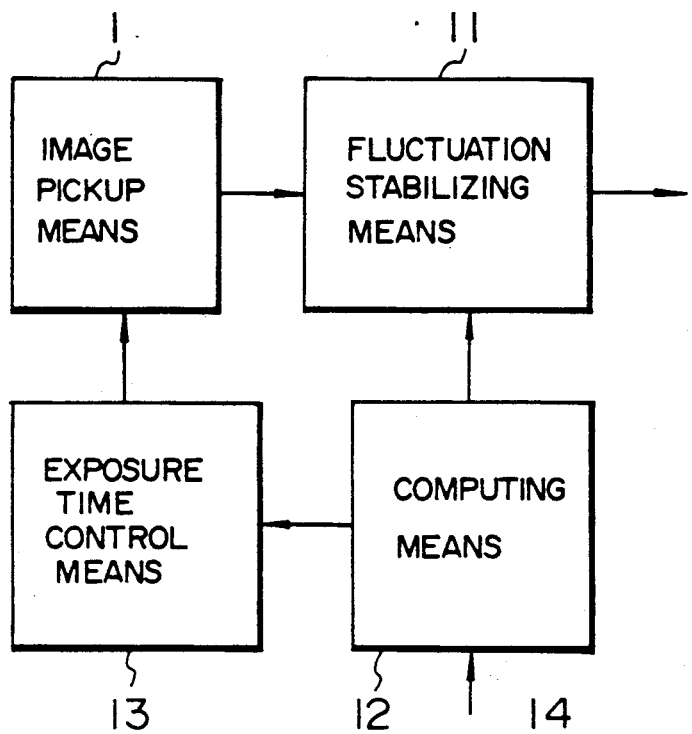
FIG. 13 is a block diagram showing an image pickup device according to the fourth embodiment of the invention.

A fourth embodiment of the present invention will be discussed below. FIG. 13 is a block diagram showing an image pickup device according to the fourth embodiment. As shown, 1 is an image pickup means, 11 is a fluctuation-stabilizing means, 12 is a computing means, 13 is an exposure time control means, and 14 is a fluctuation stabilization switching signal.

The operation of the image pickup device according to the fourth embodiment designed above will be discussed below.

At first, a user may select any mode of 95%, 90%, 75%, 50%, and off for the fluctuation stabilization switching signal 14. The selected signal is input to the computing means 12 (step 501).

The computing means 12 serves to select any stabilization reference value of 0.95, 0.9, 0.75, 0.5, and 0 (steps 507, 508, 509, 510 and 511) according to the selected mode of 95%, 90%, 75%, 50%, and off (steps 502, 503, 504, 505 and 506) and output the selected value to the stabilizing means 11. Based on the selected stabilization reference value, the exposure time reference value is computed and then output to the exposure time control means 13 in a manner to match to the relation graph shown in FIG. 5 (step 512).

The exposure time control means 13 serves to control the exposure time of the image pickup means 1 according to the exposure time reference value provided by the computing means 12. The image pickup means 1 serves to output a video signal to the stabilization controlling means 11.

The fluctuation stabilization means 12 serves to detect a motion vector for the overall section based on the video signal being input and to stabilize and output the fluctuation of the image by a product of the detected motion vector and the stabilization reference value sent from the computing means 12.

According to the present embodiment, like the third embodiment, on the constantly fluctuation-stabilized image, the blurring for one field is match in direction and magnitude to the fluctuation of the image at a field, resulting in suppressing visually unnatural factors of an image and producing an excellent fluctuation-stablized image. In addition, a user can freely select how much of fluctuation is stabilized, that is, a stabilized fluctuation amount using the fluctuation stabilization switching signal 14.

A fifth embodiment of the invention will be discussed below.

Figure 14:
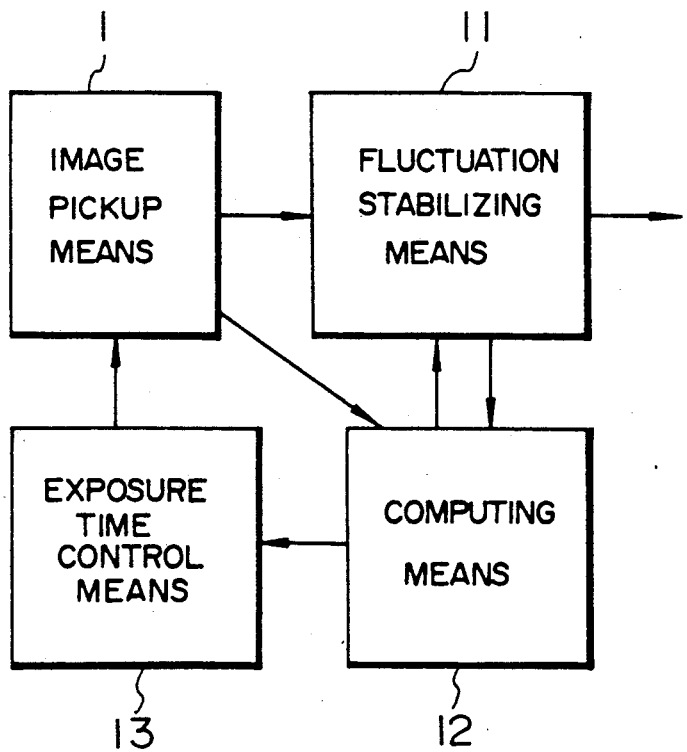
FIG. 14 is a block diagram showing an image pickup device according to a fifth embodiment of the invention.

FIG. 14 is a block diagram showing an image pickup device according to the fifth embodiment. As shown, 1 is an image pickup means, 11 is a fluctuation stabilizing means, 12 is a computing means, and 13 is an exposure time control means.

A description will be directed to the operation of the image pickup device according to the fifth embodiment designed above. The exposure time control means 13 serves to control the exposure time of the image pickup means 1 according to the exposure time reference value being inputted. Then, the image pickup means 1 serves to output a video signal to the fluctuation stabilizing means 11.

The fluctuation stabilizing means 11 serves to detect a motion vector for the overall screen using the input video signal and stabilize and output the fluctuation of the image by a product of the detected video signal and the stabilization reference value provided by the computing means 12.

Then, a description will be directed to a procedure of the computing means 12 for computing an exposure time reference value and a fluctuation stabilization reference value.

Figure 15:
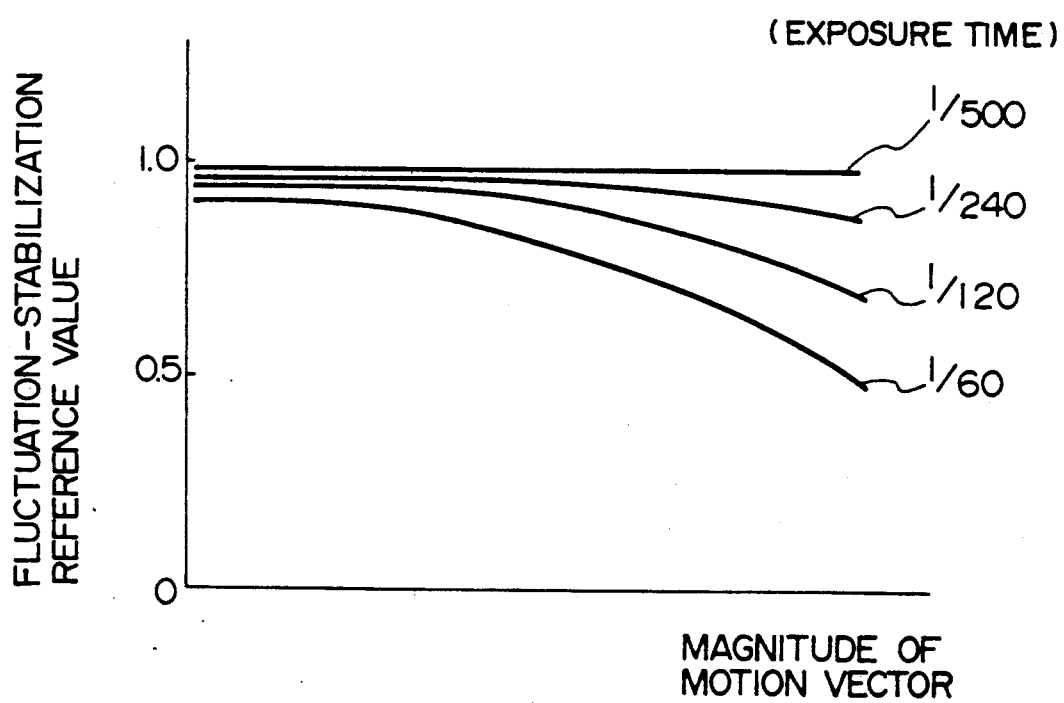
FIG. 15 is a graph showing relation among an exposure time, a magnitude of a motion vector, and a stabilization reference value used in a computing means according to the fifth embodiment of the invention.
Figure 16:
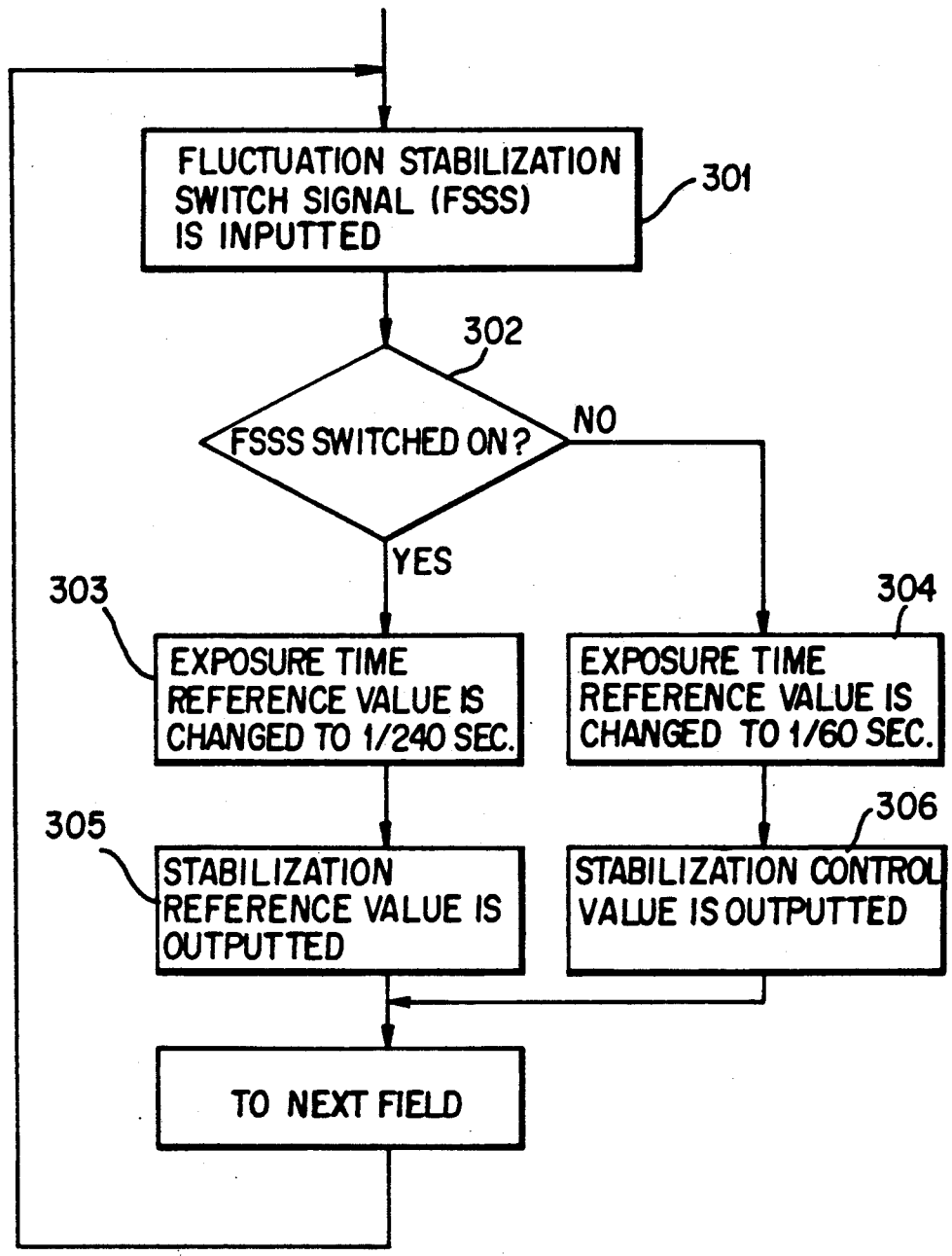
FIGS. 16–19 illustrate the operation of computing means 12.
Figure 17:
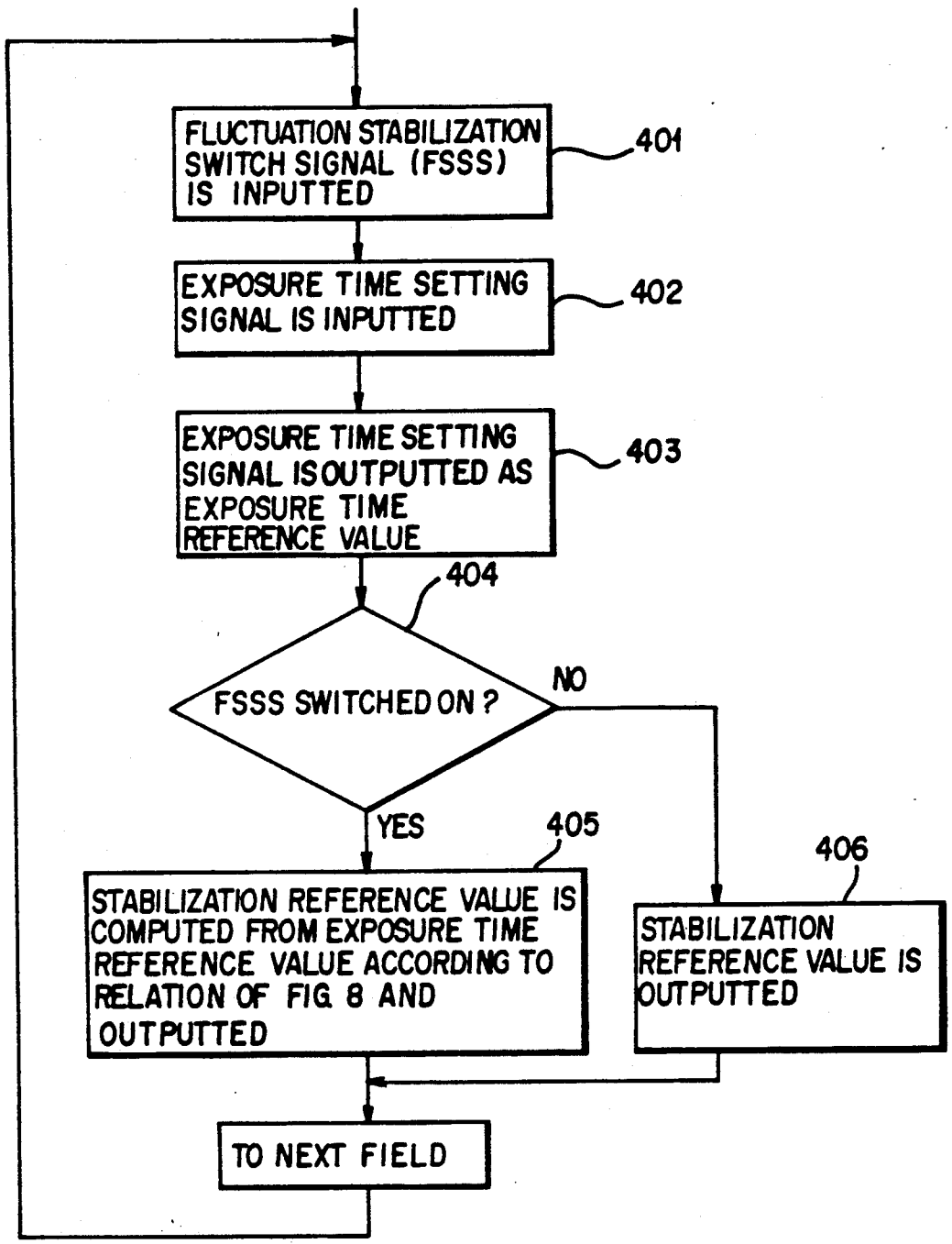
Figure 18:
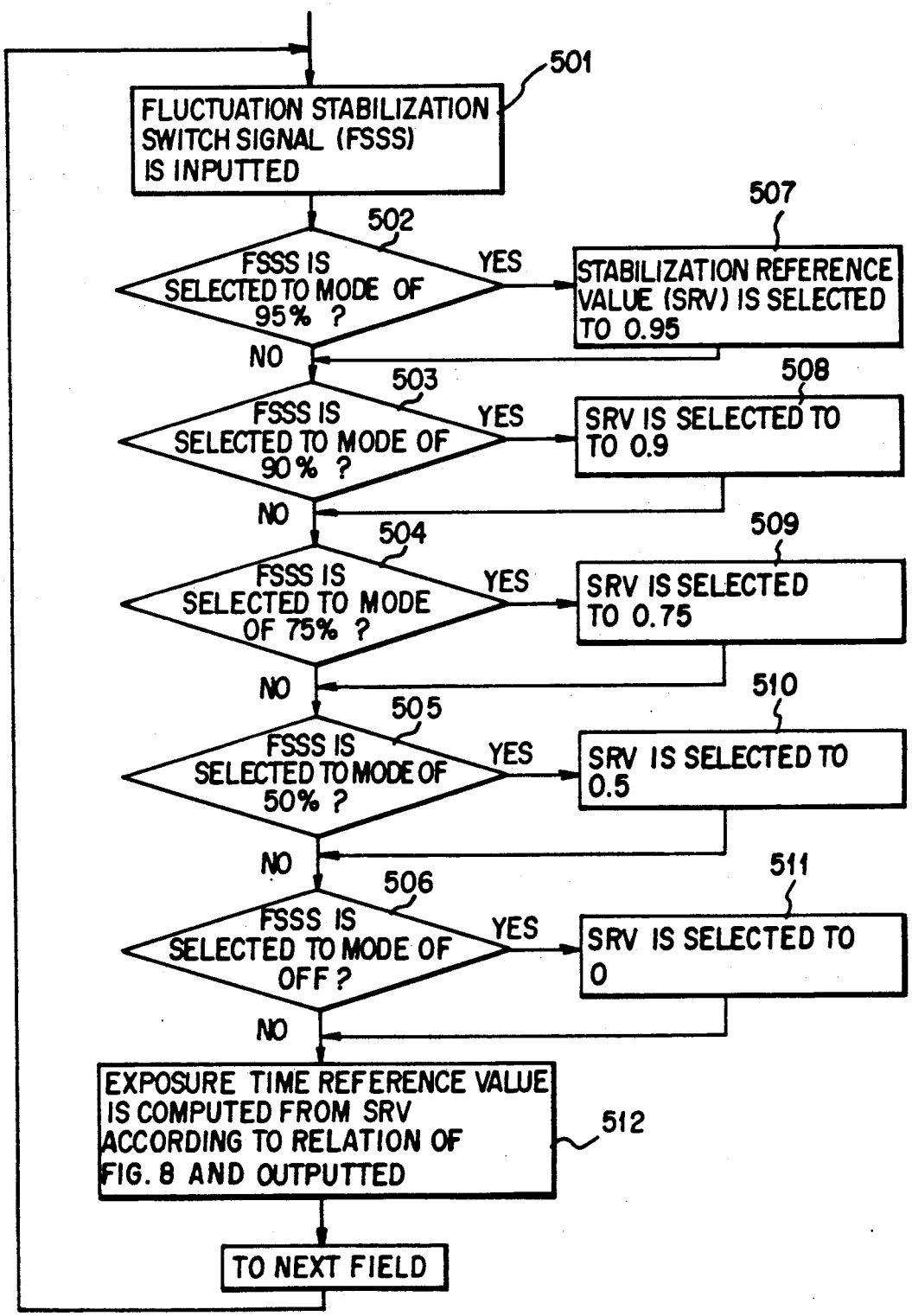
Figure 19:
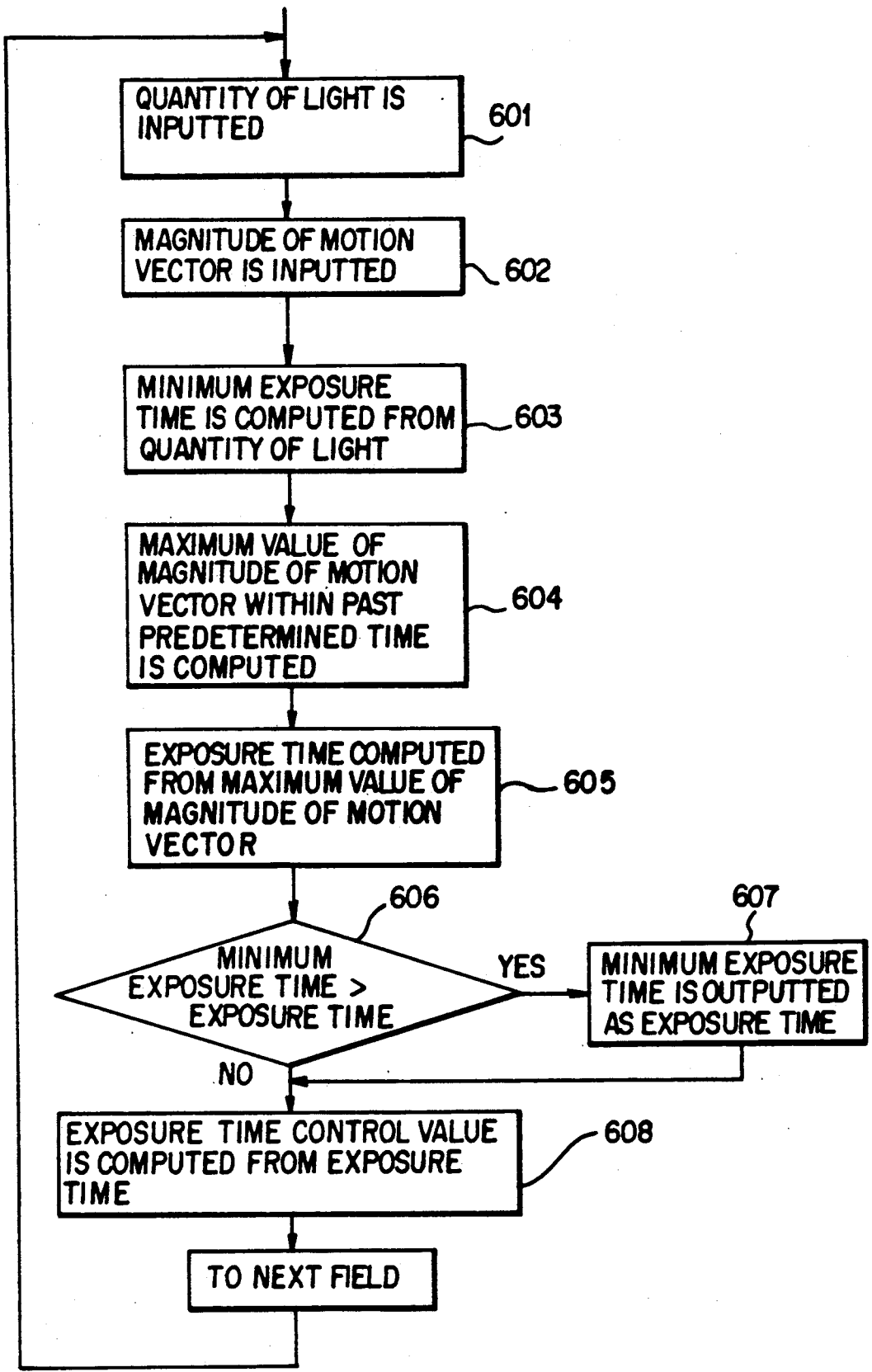

The computing means 12 receives a quantity of light of an object to be imaged from the image pickup means 1 (step 601) and a magnitude of a motion vector from the fluctuation stabilizing means 11 (step 602). At first, it derives a minimum exposure time required for imaging at a sufficient S/N ratio based on the received quantity of light (step 603). Next, according to the magnitude of the motion vector, it serves to derive a longer exposure time (step 605) if a maximum value of the magnitudes of the motion vectors at the several previous fields (step 604) is smaller than a maximum value of the minimum exposure time (step 606) and a shorter exposure time if it is larger (step 607) and then output the result to the exposure time control means 13 (step 608). And, based on the exposure time reference value computed at this step and the magnitude of the motion vector, it serves to derive a stabilized fluctuation amount against the motion vector as shown in FIG. 15 and output the result to the fluctuation stabilizing means 11.

According to the present embodiment, the magnitude of blurring for one field is proportional to a product of an exposure time and a magnitude of a motion vector. By controlling an exposure time inversely proportional to the maximum value of the magnitude of the motion vectors, it is always possible to keep the blurring within one field to a value less than a product of the maximum value of magnitude of the motion vectors and the exposure time, i.e., to a value less than a constant value. If the quantity of light of an object to be imaged is not sufficient, then an S/N ratio is reduced when an exposure time is shortened. To avoid this, a minimum exposure time is set to be inversely proportional to the quantity of light of an object to be imaged. Even if a maximum value of magnitude of the motion vector is very large, the exposure time is limited to an amount less than the minimum exposure time to thereby maintain the S/N ratio to be more than a predetermined constant value. Hence, if the magnitude of a blurring exceeds a constant value, it is possible to match the blurring to the fluctuation on the stabilized image by controlling the stabilized fluctuation amount, resulting in producing a visually natural image.

According to the first to fifth embodiments, the fluctuation stabilizing means has been designed to derive a motion vector for an overall screen from a video signal. Yet, an acceleration sensor or gyroscope may be provided for sensing how an image pickup device is fluctuated. On the sensed fluctuation, the fluctuation stabilizing means serves to derive a motion vector for an overall screen resulting from the fluctuated image pickup device.

According to the first and the second embodiments, though the exposure time required for fluctuation stabilization is 1/240 sec, the time is effective if it is shorter than a one-field time. And, the exposure time may be easily selected by a user. It is to be noted that the exposure time is automatically selected to 1/500 sec if the fluctuation is stabilized and then it may be optionally reset by a user.

Further, according to the first and the second embodiments, the fluctuation stabilization is done for stabilizing unnecessary fluctuating components of an image. However, by intentionally leaving a small amount of fluctuating components without stabilizing all the fluctuating components, it is possible to match the blurring for one field to the fluctuation at each field in direction and magnitude on a fluctuation-stabilized image, resulting in further suppressing visually unnatural factors of an image.

According to the third embodiment, the user can set the exposure time setting signal 15. However, the exposure time setting signal 15 can be automatically set depending on brightness of an object to be imaged. In this instance, what the user should do is merely to select any mode of the fluctuation stabilization switching signal 14, resulting in producing a natural image about the fluctuation and the blurring of an image and with a little noise.

Figure 11:
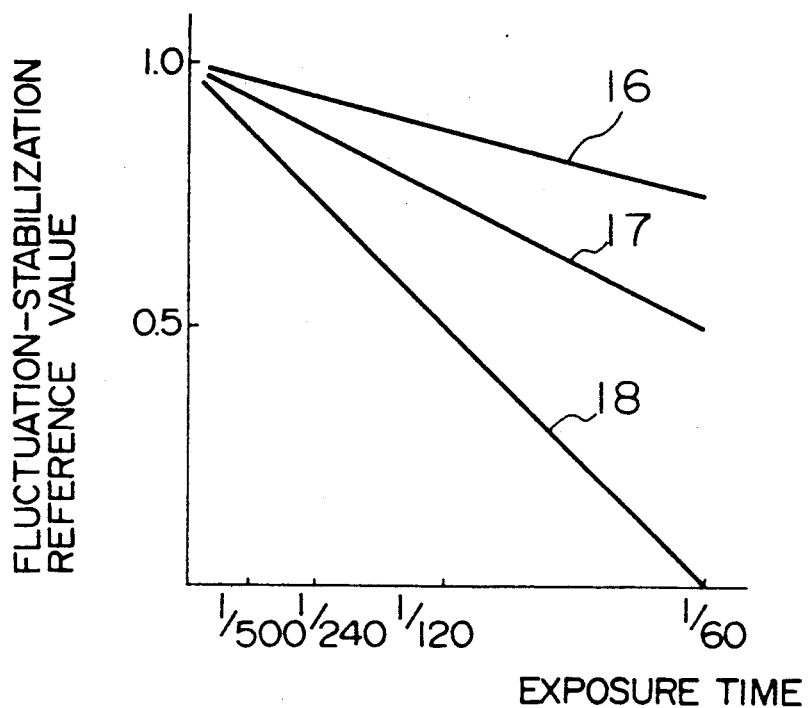
FIG. 11 is a graph showing relation between an exposure time and a fluctuation-stabilizing reference value used in a computing means 12 according to fluctuations of the third and the fourth embodiments of the invention.

According to the third and the fourth embodiments, the relation between the exposure time and the fluctuation stabilization reference value may be nonlinear. As shown in FIG. 11, for example, the relation between the exposure time and the fluctuation-stabilization reference value may take three types of 16, 17, 18, one of which can be selected by a user. If the relation 16 is selected, on the fluctuation-stabilized image, the blurring for each field is relatively larger than the fluctuation at a field, so that the blurred image may visually appear like a lag. Yet, a great effect for stabilizing fluctuation is provided. If the relation 18 is selected, an effect for stabilizing fluctuation is made smaller, but the blurred image may not visually appear like a lag. Accordingly, it is very convenient for a user to select any of these relations depending on the circumstance and his preference.

Figure 12:
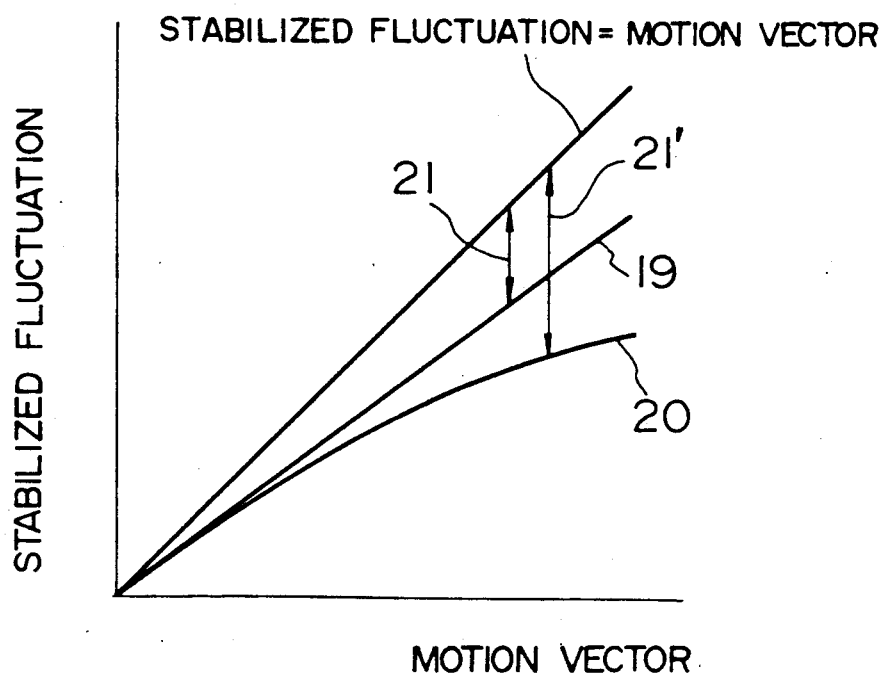
FIG. 12 is a graph showing relation between a motion vector and a stabilization in a fluctuation stabilizing means 11 according to fluctuations of the third and the fourth embodiments of the invention.

According to the third and the fourth embodiments, the fluctuation stabilizing means has been designed to stabilize the fluctuation by a product of a motion vector and a stabilization reference value. the resulting relation between the motion vector and the stabilized fluctuation is linear as shown by 19 in FIG. 12. The ratio of the stabilized fluctuation 19 to the remaining fluctuation 21 is kept constant. The relation, however, may be nonlinear as shown by 20 in FIG. 12. As the motion vector becomes larger, the ratio of the stabilized fluctuation 20 to the remaining fluctuation 21' is made larger, resulting in causing a more natural blurring for a field on the stabilized image.

In the aforementioned embodiments, the common references having the same numerals.

According to the fifth embodiment, the exposure time used for the exposure time control means 13 and the image pickup means 1 may be a continuous value being smoothly changed and a discrete value being switched. If the exposure time is a discrete value being switched, a video signal level at the exposure time switching time does not change serially. For stabilizing this disadvantageous change, however, the image pickup means 1 may change a gain of a video signal in a stepwise manner.

Further, by employing the constructions for performing the quite same operation as the third to the fifth embodiments, it is possible to switch these constructions to a preferable one depending on the circumstance and user's preference.

According to the second to the fifth embodiments, when the computing means 12 derives a stabilization reference value and an exposure time reference value, there have been used some factors such as a stabilization switching signal, an exposure time setting signal, a quantity of light of an object to be imaged, and a magnitude of a motion vector. In addition to them, some other values may be easily used. For example, a zoom magnification or a diaphragm value may be used. In addition, the computing means may be realized with an actual circuit or software run in a microcomputer.

As has been mentioned earlier, by providng a fluctuation stabilizing means and an exposure time control means, the fluctuation of an image and the blurring of a one-field image may be suppressed to a minimum even if an image is picked up in a fluctuating state of the image pickup device. It results in providing an image pickup device which can offer a visually natural image with little fluctuation.

Moreover, provision of a fluctuation stabilizing means, an exposure time control means, and a computing means for computing a stabilization reference value and an exposure time reference value for the fluctuation controlling means and the exposure time control means results in realizing an image pickup device which can offer an excellent image, that is, the image where the relation between the fluctuation of the image and the blurring of the one-field image seems visually natural even if an image is picked up when the image pickup device is handled in a fluctuating state.

What is claimed is:

1. An image pickup device comprising image pickup means, stabilizing means for stabilizing an unnecessary vibration of an image output by said image pickup means according to a stabilization reference value, control means for controlling an exposure time used for said image pickup means according to an exposure time reference value, and computing means for computing said stabilization reference value and said exposure time reference value.

2. The image pickup device claimed in claim 1, wherein said stabilization reference value includes two states of ON and OFF, said ON state indicating that the fluctuation stabilization is executed and the OFF state indicating that the fluctuation stabilization is suspended, and when said ON state is selected, said computing means computes the exposure time reference value such that the exposure time is less than a predetermined time.

3. The image pickup device claimed in claim 1, wherein the computing means computes the stabilization reference value based on the exposure time reference value.

4. The image pickup device claimed in claim 1 wherein the computing means computes the exposure time reference value based on the stabilization reference value.

5. The image pickup device claimed in claim 1 wherein the computing means employs a fluctuating amount of an image output by said stabilizing means for computation of at least one of said stabilization reference value and said exposure time reference value.

* * * * *